(12) United States Patent
Wien et al.

(10) Patent No.: US 7,361,275 B2
(45) Date of Patent: **\*Apr. 22, 2008**

(54) USE OF DERIVATIZED NANOPARTICLES TO MINIMIZE GROWTH OF MICRO-ORGANISMS IN HOT FILLED DRINKS

(75) Inventors: Richard W. Wien, Pittsford, NY (US); David L. Patton, Webster, NY (US); Joseph F. Bringley, Rochester, NY (US); Yannick J. F. Lerat, Mellecey (FR)

(73) Assignee: Eastman Kodak Company, Rochester, NY (US)

( * ) Notice: Subject to any disclaimer, the term of this patent is extended or adjusted under 35 U.S.C. 154(b) by 464 days.

This patent is subject to a terminal disclaimer.

(21) Appl. No.: 10/823,443

(22) Filed: Apr. 13, 2004

(65) Prior Publication Data
US 2005/0224416 A1 Oct. 13, 2005

(51) Int. Cl.
*B01D 57/00* (2006.01)
*A23L 1/015* (2006.01)

(52) U.S. Cl. .................... 210/638; 53/402; 210/764; 210/912; 422/41; 426/271; 426/326; 426/330.3; 426/422

(58) Field of Classification Search ............... 422/41
See application file for complete search history.

(56) References Cited

U.S. PATENT DOCUMENTS

| | | | |
|---|---|---|---|
| 4,585,559 A * | 4/1986 | DeVoe et al. ............... 210/679 |
| 4,612,122 A * | 9/1986 | Ambrus et al. ............. 210/638 |
| 4,965,084 A | 10/1990 | Austin et al. ............... 426/422 |
| 5,049,280 A | 9/1991 | Raymond et al. ........... 210/638 |
| 5,492,742 A * | 2/1996 | Zenner et al. ............. 428/35.2 |
| 5,854,303 A * | 12/1998 | Powell et al. ............... 523/106 |
| 6,106,866 A * | 8/2000 | Ranney ....................... 424/499 |
| 6,132,750 A | 10/2000 | Perrier et al. ............... 424/418 |
| 6,296,760 B1 * | 10/2001 | Petty et al. ............ 210/170.01 |
| 6,465,065 B1 * | 10/2002 | Teumac et al. ............. 428/35.7 |
| 6,548,264 B1 * | 4/2003 | Tan et al. ................... 435/7.21 |

(Continued)

FOREIGN PATENT DOCUMENTS

FR 0 772 019 6/1999
WO WO 03/088914 10/2003

OTHER PUBLICATIONS

"Inorganic Chemistry in Biology and Medicine", by Raymond et al., Chapter 18, ACS Symposium Series, Washington, DC (1980).
"Inorganic Chemistry in Biology and Medicine", by Raymond et al., Chapter 17, ACS Symposium Series, Washington, DC (1980).
"Critical Stability Constants" by A. E. Martell and R. M. Smith, vols. 1-4, Plenum Press, NY (1977).

(Continued)

*Primary Examiner*—Peter A. Hruskoci
(74) *Attorney, Agent, or Firm*—Frank Pincelli; Eugene Shkurko (57) ABSTRACT

A method and article for removing a selected metal-ion from a solution. The method included providing a container for holding a liquid, the container having an internal surface having a metal-ion sequestering agent provided on at least a portion of the internal surface for removing a designated metal-ions from the liquid; filling the container with the liquid in an open environment; closing the container with the liquid contained therein; and shipping the container for use of the liquid without any further processing of the container containing the liquid.

15 Claims, 8 Drawing Sheets

U.S. PATENT DOCUMENTS

| | | | |
|---|---|---|---|
| 6,616,997 B1 * | 9/2003 | Lauer et al. | 428/36.5 |
| 6,667,082 B2 * | 12/2003 | Bamore et al. | 428/34.8 |
| 6,830,694 B2 * | 12/2004 | Schiestel et al. | 210/660 |
| 6,933,046 B1 * | 8/2005 | Cook | 428/402 |
| 6,933,055 B2 * | 8/2005 | Share et al. | 428/474.4 |
| 7,029,768 B1 * | 4/2006 | Ohmori et al. | 428/702 |
| 7,258,804 B2 * | 8/2007 | Patton et al. | 210/764 |
| 2002/0000289 A1 | 1/2002 | Nickell et al. | 156/244.13 |

OTHER PUBLICATIONS

R. D. Hancock and A. E. Martell, Chem. Rev. vol. 89, p. 1875-1914 (1989).

"Stability Constants of Metal-ion Complexes", The Chemical Society, London 1964.

"Polymer Permeability", by J. Comyn, Elsevier, NY 1985.

"Permeability and Other Film Properties of Plastics and Elastomers" Plastics Design Library, NY 1995.

\* cited by examiner

USE OF DERIVATIZED NANOPARTICLES TO MINIMIZE GROWTH OF MICRO-ORGANISMS IN HOT FILLED DRINKS

CROSS REFERENCE TO RELATED APPLICATIONS

Reference is made to commonly assigned U.S. patent application Ser. No. 10/823,453 filed on Apr. 13, 2004 now U.S. Pat. No. 7,311,933, entitled: CONTAINER FOR INHIBITING MICROBIAL GROWTH IN LIQUID NUTRIENTS by David L. Patton, Joseph F. Bringley, Richard W. Wien, John M. Pochan, Yannick J. F. Lerat; U.S. patent application Ser. No. 10/823,446 filed on Apr. 13, 2004 now U.S. Pat. No. 7,258,786, entitled: USE OF DERIVATIZED NANOPARTICLES TO MINIMIZE GROWTH OF MICRO-ORGANISMS IN HOT FILLED DRINKS by Richard W. Wien, David L. Patton, Joseph F. Bringley, Yannick J. F. Lerat; U.S. patent application Ser. No. 10/822,945 filed Apr. 13, 2004 entitled: ARTICLE FOR INHIBITING MICROBIAL GROWTH IN PHYSIOLOGICAL FLUIDS by Joseph F. Bringley, David L. Patton, Richard W. Wien, Yannick J. F. Lerat; U.S. patent application Ser. No. 10/822,940 filed Apr. 13, 2004 entitled: DERIVATIZED NANOPARTICLES COMPRISING METAL-ION SEQUESTRAINT by Joseph F. Bringley; and U.S. patent application Ser. No. 10/822,929 filed Apr. 13, 2004 entitled: COMPOSITION OF MATTER COMPRISING POLYMER AND DERIVATIZED NANOPARTICLES by Joseph F. Bringley, Richard W. Wien, Richard L. Parton; U.S. patent application Ser. No. 10/822,939 filed Apr. 13, 2004 entitled: COMPOSITION COMPRISING INTERCALATED METAL-ION SEQUESTRANTS by Joseph F. Bringley, David L. Patton, Richard W. Wien; the disclosures of which are incorporated herein by reference.

FIELD OF THE INVENTION

The present invention relates to using metal-ion sequestering agents in a container filling process for removing a designated metal-ion from a liquid nutrient for inhibiting growth of microbes in the liquid nutrient.

BACKGROUND OF THE INVENTION

During the process of filling containers with certain beverages and foodstuffs, air borne micro-organisms may enter the containers after the flash pasteurization or pasteurization part of the process. These micro-organisms such as yeast, spores, bacteria, etc. will grow in the nutrient rich beverage or food, ruining the taste or even causing hazardous micro-biological contamination. While some beverages are packaged by aseptic means or by utilizing preservatives, many other beverages for example fruit juices, teas and isotonic drinks are "hot-filled". "Hot-filling" involves the filling of a container with a liquid beverage having some elevated temperature (typically, at about 180-200° F.). The container is capped and allowed to cool, producing a vacuum therein. The process of hot filling of beverages and foods is used to kill micro-organisms that enter the container during the filling of the beverage or food containers. Hot filling requires containers be made of certain materials or constructed in a certain fashion such as thicker walls to withstand the hot filling process. The energy required for hot filling adds to the cost of the filling process. Temperatures required for hot filling have a detrimental effect on the flavor of the beverage. Other methods of filling, such as aseptic filling, require large capital expenditures and maintenance of class 5 clean room conditions.

It has been recognized that small concentrations of metal-ions play an important role in biological processes. For example, Mn, Fe, Ca, Zn, Cu and Al are essential bio-metals, and are required for most, if not all, living systems. Metal-ions play a crucial role in oxygen transport in living systems, and regulate the function of genes and replication in many cellular systems. Calcium is an important structural element in the formation of bones and other hard tissues. Mn, Cu and Fe are involved in metabolism and enzymatic processes. At high concentrations, metals may become toxic to living systems and the organism may experience disease or illness if the level cannot be controlled. As a result, the availability, and concentrations, of metal-ions in biological environments is a major factor in determining the abundance, growth-rate and health of plant, animal and micro-organism populations. It has been recognized that iron is an essential biological element, and that all living organisms require iron for survival and replication. Although, the occurrence and concentration of iron is relatively high on the earth's surface, the availability of "free" iron is severely limited by the extreme insolubility of iron in aqueous environments. As a result, many organisms have developed complex methods of procuring "free" iron for survival and replication.

Methods for packaging drinks and liquid foodstuffs are needed that are able to improve food quality, to increase shelf-life, to protect from microbial contamination, and to do so in a manner that is safe and environmentally clean. Methods are needed that are able to target and remove specific, biologically important, metal-ions while leaving intact the concentrations of beneficial metal-ions.

Problem to be Solved by the Invention

"Hot filling" provides various advantages over aseptic or preservative packaging, among them lower capital and operational cost (over aseptic systems), and the elimination of the need for preservatives (the heat of the beverage has a sanitizing effect). The hot headspace in the filled bottle also reduces the carrying capacity of oxygen therein, limiting oxidation of the contents. There is however a problem in the hot filling of beverages and foods when used to kill air borne micro-organisms, that enter the containers during the filling process after the flash pasteurization or pasteurization of the beverage or food. Hot filling requires containers be made of certain materials or constructed in a certain fashion such as the use of thicker walls, more material and specific shapes to withstand the hot filling process. The energy required for hot filling adds to the cost of the filling process. Temperatures required for hot filling have a detrimental effect on the flavor of the beverage. Hot filling adds additional time to the manufacturing process in both the heating and cooling of the containers. The manufacturers of the beverages and foodstuffs are loathe to add antimicrobial materials directly to the beverages and foods because these may potentially alter the color or taste of items such as beverages and foodstuffs, and in the worst case may be harmful to the persons using or consuming those items. The wide spread use of antimicrobial materials may cause further problems in that disposal of the items containing these materials cannot be accomplished without impacting the biological health of the landfill or other site of disposal; and further the antimicrobial compounds may leach into surrounding rivers, lakes and water supplies. The wide spread use of antimicrobial materials may cause yet further problems in that micro-organisms may develop resistance to these materials and new infectious microbes and new diseases may develop.

SUMMARY OF THE INVENTION

In accordance with one aspect of the present invention, there is provided a method of removing a selected metal-ion from a solution, comprising the steps of;

a. providing a container for holding a liquid, the container having an internal surface having a metal-ion sequestering agent provided on at least a portion of the internal surface for removing designated metal-ions from the liquid;

b. filling the container with the liquid in an open environment;

c. closing the container with the liquid contained therein; and d. shipping the container for use of the liquid without any further processing of the container containing the liquid.

In accordance with another aspect of the present invention, there is provided a method for bottling a liquid having a pH equal to or greater than about 2.5, comprising the steps of:

a. providing a container having a metal-ion sequestering agent provided on at least a portion of the internal surface for inhibiting growth of microbes;

b. filling the container with a liquid having a pH equal to or greater than about 2.5;

c. closing the container with the liquid contained therein; and d. shipping the container for use without any further sterilization of the liquid and/or container.

In accordance with still another aspect of the present invention, there is provided an article for inhibiting the growth of microbes in a liquid nutrient when placed in contact with the nutrient, the article having a metal-ion sequestering agent such that when the article is placed in contact with the liquid nutrient the metal-ion sequestering agent inhibits the growth of microbes in the liquid nutrient.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
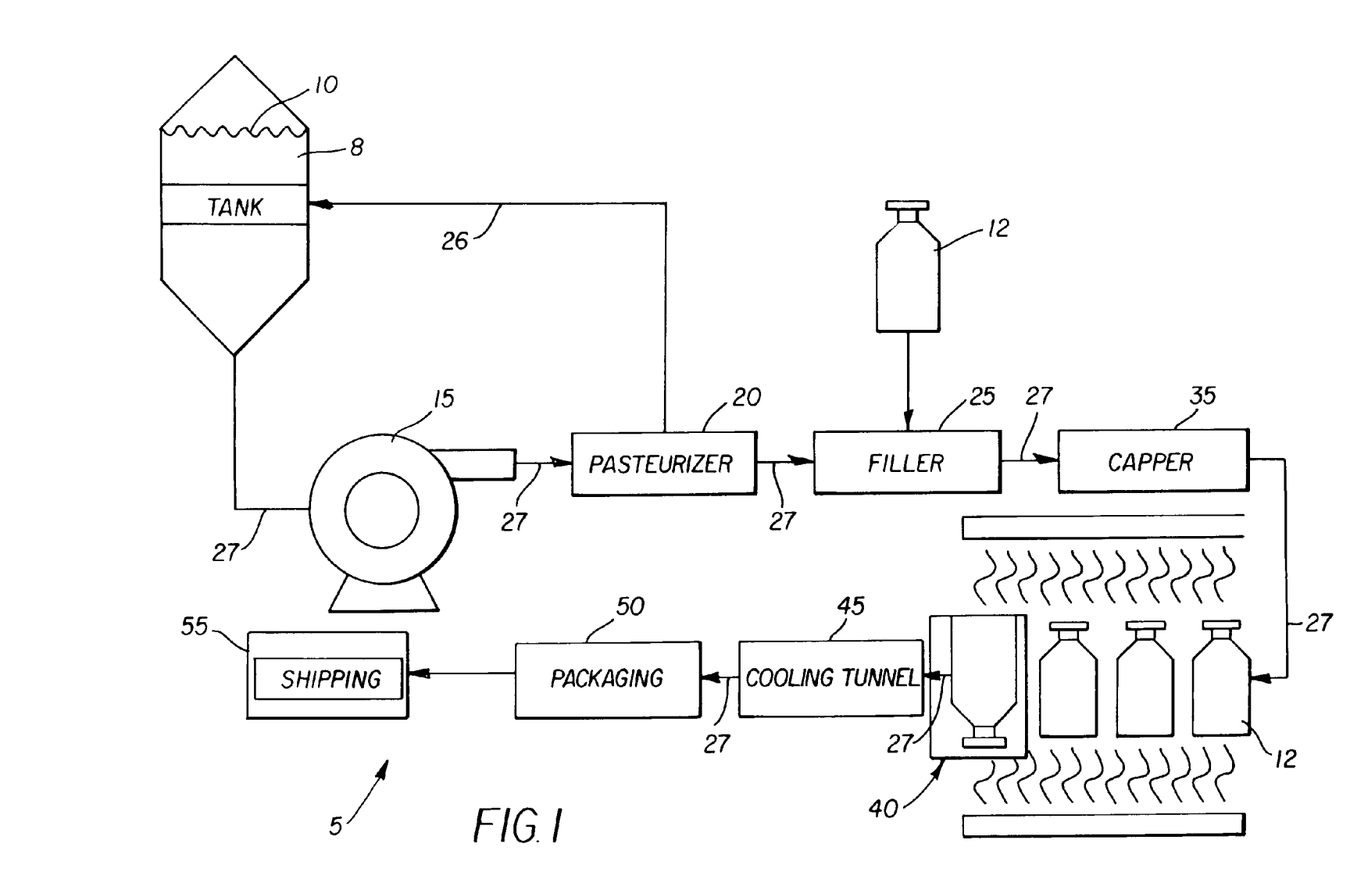
FIG. 1 is a schematic of a hot fill bottling process made in accordance with the prior art.

Referring to FIG. 1, there is illustrated a schematic view of a prior art system of a "hot fill" process 5 for bottling certain types of liquid nutrients 8 such as isotonic beverages having a pH equal to or greater than about 2.5 made in accordance with the prior art. Drinks such as Gatorade™ or PowerAide™, fruit drinks, and teas are examples of isotonic beverages. The bottling process typically begins with cleaned and sanitized containers such as bottles 12 formed from glass or using a polymer as described in FIGS. 2 and 3. The "hot fill" process of FIG. 1 may also be used for filling various other containers, for example but not limited to, bags, stand up pouches, juice boxes, cans, etc. After formulation, the beverage 8 is usually stored in a tank 10 until it is pumped via a pump 15 through a pasteurizer 20 to a filler station 25. Excess beverage may be pumped back to the tank 10 via line 26. Although these systems may integrate one or more functions, such systems are typically exposed in one way or another to the environment such that contaminants or other micro-organisms can enter into the filling or bottling process at one or more locations along the processing path 27. At the same time sanitized bottles 12 are also supplied to the filler station 25 wherein the beverage 8 is dispensed into the bottle 12. The bottle 12 is then moved to a capper 35 where the bottle 12 is sealed. Afterward the filled sealed bottle 12 is transported through a heating tunnel 40 where the beverage in the sealed bottle 12 is heated to a temperature typically about 180-200° F. The bottle 12 is then transported through a cooling tunnel 45 where it is inverted to insure the entire inside of the bottle 12 is subjected to the heated beverage before it is discharged to the packaging station 50, packaged and subsequently shipped at the shipping station 55.

Figure 2:
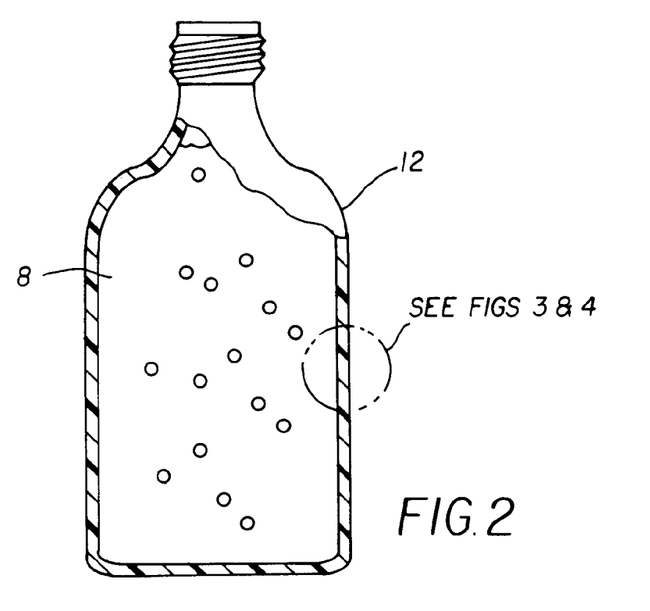
FIG. 2 illustrates a cross section of a fluid container made in accordance with the prior art.
Figure 3:
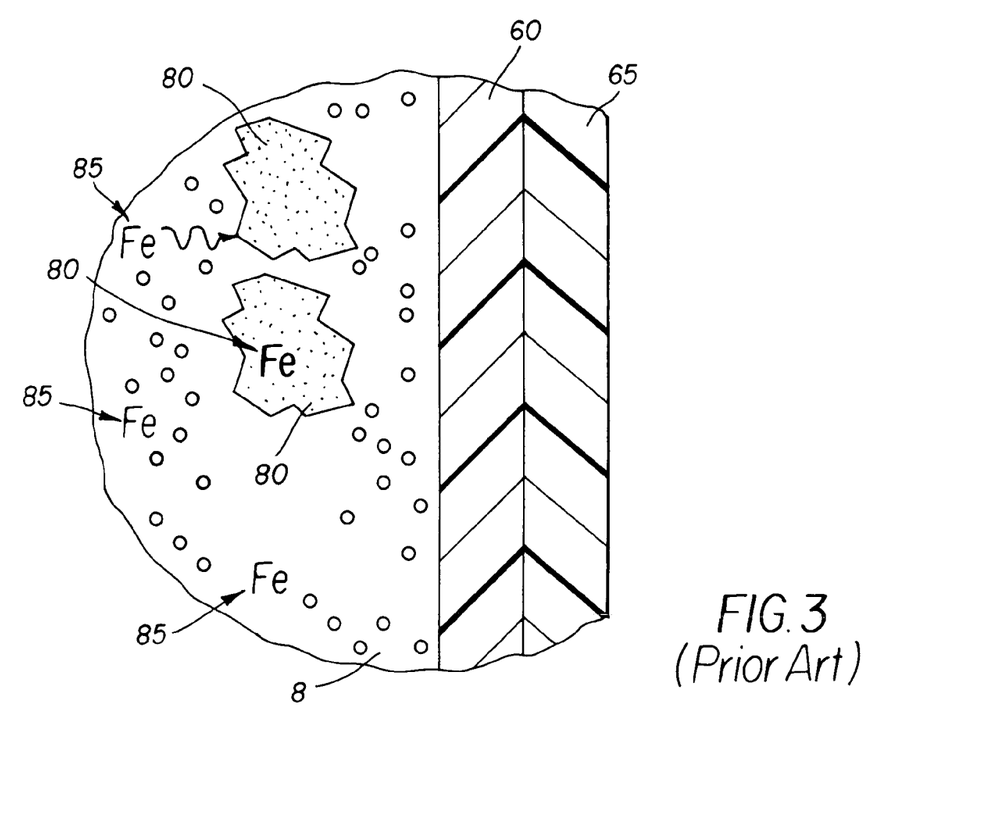
FIG. 3 is an enlarged partial cross sectional view of a portion of the container of FIG. 2.

Referring to FIG. 2, there is illustrated a cross-sectional view of a typical prior art container 12. The container 12 comprises the bottle 12 holding the liquid nutrient 8, for example the isotonic beverage. The container 12 may be made of one or more layers of a plastic polymer using various molding processes known by those skilled in the art. Examples of polymers used in the manufacture of plastic bottles are PET (polyethylene terephthalate), PP (polypropylene), LDPE (low density polyethylene) and HDPE (high density polyethylene). FIG. 3 illustrates a plastic bottle 12 formed using two different polymeric layers 60 and 65. However it is to be understood that the container 12 may comprise any desired number of layers.

A fluid container, such a container 12 illustrated in FIG. 4 and discussed in greater detail later herein, made in accordance with the present invention is especially useful for containing a liquid nutrient, for example a beverage, having a pH equal to or greater than about 2.5. The higher the pH, the more beneficial is obtained from a container made in accordance with the present invention. Thus, if the pH is 3.0 or 4.0 or greater the present invention will provide greater benefit. The container is designed to have an interior surface having a metal-ion sequestering agent for removing a designated metal-ion from a liquid nutrient for inhibiting growth of microbes in said liquid nutrient. It is preferred that the metal-ion sequestering agent is immobilized on the support structure and has a high-selectivity for biologically important metal-ions such as Mn, Zn, Cu and Fe. This is important because metal-ion sequestrants that are not immobilized may diffuse through the material or polymeric layers of the container and dissolve into the contents of the beverage. Metal-ions complexed by dissolved sequestrants will not be sequestered within the surfaces of the container but may be available for use by micro-organisms.

It is preferred that the fluid container made in accordance with the present invention comprises a polymer containing said metal-ion sequestraint. The container may comprise the polymer itself containing said metal-ion sequestraint, or alternatively, the metal-ion sequestraint may be contained with a polymeric layer attached to a support structure. It is preferred that said polymer is permeable to water. It is important that the polymer is permeable to water because permeability facilitates the contact of the target metal-ions with the metal-ion sequestraint, which, in turn, facilitates the sequestration of the metal-ions within the polymer or polymeric layer. A measure of the permeability of various polymeric addenda to water is given by the permeability coefficient, P that is given by $P =$ (quantity of permeate)(film thickness)/[area× time×(pressure drop across the film)]

Permeability coefficients and diffusion data of water for various polymers are discussed by J. Comyn, in *Polymer Permeability*, Elsevier, N.Y., 1985 and in "Permeability and Other Film Properties Of Plastics and Elastomers", Plastics Design Library, NY, 1995. The higher the permeability coefficient, the greater the water permeability of the polymeric media. The permeability coefficient of a particular polymer may vary depending upon the density, crystallinity, molecular weight, degree of cross-linking, and the presence of addenda such as coating-aids, plasticizers, etc. It is preferred that the polymer has a water permeability of greater than 1000 $[(cm^3cm)/(cm^2sec/Pa)] \times 10^{13}$. It is further preferred that the polymer has a water permeability of greater than 5000 $[(cm^3cm)/(cm^2sec/Pa)] \times 10^{13}$. Preferred polymers for practice of the invention are polyvinyl alcohol, cellophane, water-based polyurethanes, polyester, nylon, high nitrile resins, polyethylene-polyvinyl alcohol copolymer, polystyrene, ethyl cellulose, cellulose acetate, cellulose nitrate, aqueous latexes, polyacrylic acid, polystyrene sulfonate, polyamide, polymethacrylate, polyethylene terephthalate, polystyrene, polyethylene, polypropylene or polyacrylonitrile. It is preferred that the metal-ion sequestraint comprises 0.1 to 50.0% by weight of the polymer, and more preferably 1% to 10% by weight of the polymer.

In a preferred embodiment, the container 12 comprises a plurality of layers having an outer layer having a metal-ion sequestering agent. In another preferred embodiment, the container comprises a plurality of layers comprising a barrier layer for contact with said beverage or foodstuff and an inner layer having said sequestering agent, said inner layer having a first side adjacent said barrier layer, and said barrier layer allowing liquid to pass thru to said inner layer. Multiple layers may be necessary to provide a rigid structure, able to contain foodstuffs, and to provide physical robustness. In a particular case there may be provided a second outer layer on the second side of said inner layer. It is preferred that both the first and second outer layer comprise a barrier layer that allows liquid to pass thru to said inner layer. The barrier layer does not contain the metal-ion sequestraint. However, the primary purpose of the barrier layer is to provide a barrier through which micro-organisms cannot pass. It is important to limit, or eliminate, the direct contact of micro-organisms with the metal-ion sequestraint or the layer containing the metal-ion sequestraint, since many micro-organisms, under conditions of iron deficiency, may bio-synthesize molecules which are strong chelators for iron, and other metals. These bio-synthetic molecules are called "siderophores" and their primary purpose is to procure iron for the micro-organisms. Thus, if the micro-organisms are allowed to directly contact the metal-ion sequestraint, they may find a rich source of iron there, and begin to colonize directly at these surfaces. The siderophores produced by the micro-organisms may compete with the metal-ion sequestraint for the iron (or other bio-essential metal) at their surfaces. The barrier layer of the invention does not contain the metal-ion sequestraint, and because micro-organisms are large, they may not pass or diffuse through the barrier layer. The barrier layer thus prevents contact of the micro-organisms with the polymeric layer containing the metal-ion sequestraint of the invention.

It is preferred that the metal-ion sequestraint has a high-affinity for biologically important metal-ions such as Mn, Zn, Cu and Fe. A measure of the "affinity" of metal-ion sequestraints for various metal-ions is given by the stability constant (also often referred to as critical stability constants, complex formation constants, equilibrium constants, or formation constants) of that sequestraint for a given metal-ion. Stability constants are discussed at length in "Critical Stability Constants", A. E. Martell and R. M. Smith, Vols. 1-4, Plenum, N.Y. (1977), "Inorganic Chemistry in Biology and Medicine", Chapter 17, ACS Symposium Series, Washington, D.C. (1980), and by R. D. Hancock and A. E. Martell, Chem. Rev. vol. 89, p. 1875-1914 (1989). The ability of a specific molecule or ligand to sequester a metal-ion may depend also upon the pH, the concentrations of interfering ions, and the rate of complex formation (kinetics). Generally, however, the greater the stability constant, the greater the binding affinity for that particular metal-ion. Often the stability constants are expressed as the natural logarithm of the stability constant. Herein the stability constant for the reaction of a metal-ion (M) and a sequestraint or ligand (L) is defined as follows:

where the stability constant is $\beta_n = [ML_n]/[M][L]^n$, wherein $[ML_n]$ is the concentration of "complexed" metal-ion, $[M]$ is the concentration of free (uncomplexed) metal-ion and $[L]$ is the concentration of free ligand. The log of the stability constant is log $\beta_n$, and n is the number of ligands, which coordinate with the metal. It follows from the above equation that if $\beta_n$ is very large, the concentration of "free" metal-ion will be very low. Ligands with a high stability constant (or affinity) generally have a stability constant greater than $10^{10}$ or a log stability constant greater than 10 for the target metal. Preferably the ligands have a stability constant greater than $10^{15}$ for the target metal-ion. Table 1 lists common ligands (or sequestraints) and the natural logarithm of their stability constants (log $\beta_n$) for selected metal-ions.

TABLE 1

Common ligands (or sequestraints) and the natural logarithm of their stability constants (log $\beta_n$) for selected metal-ions.

| Ligand | Ca | Mg | Cu(II) | Fe(III) | Al | Ag | Zn |
|---|---|---|---|---|---|---|---|
| alpha-amino carboxylates | | | | | | | |
| EDTA | 10.6 | 8.8 | 18.7 | 25.1 | | 7.2 | 16.4 |
| DTPA | 10.8 | 9.3 | 21.4 | 28.0 | 18.7 | 8.1 | 15.1 |
| CDTA | 13.2 | | 21.9 | 30.0 | | | |
| NTA | | | | 24.3 | | | |
| DPTA | 6.7 | 5.3 | 17.2 | 20.1 | 18.7 | 5.3 | |
| PDTA | 7.3 | | 18.8 | | | | 15.2 |

TABLE 1-continued

Common ligands (or sequestraints) and the natural logarithm of their stability constants (log $\beta_n$) for selected metal-ions.

| Ligand | Ca | Mg | Cu(II) | Fe(III) | Al | Ag | Zn |
|---|---|---|---|---|---|---|---|
| citric Acid | 3.50 | 3.37 | 5.9 | 11.5 | 7.98 | 9.9 | |
| salicylic acid | | | | 35.3 | | | |
| Hydroxamates | | | | | | | |
| Desferroxamine B | | | | 30.6 | | | |
| acetohydroxamic acid | | | | 28 | | | |
| Catechols | | | | | | | |
| 1,8-dihydroxy naphthalene 3,6 sulfonic acid | | | | 37 | | | |
| MECAMS | | | | 44 | | | |
| 4-LICAMS | | | | 27.4 | | | |
| 3,4-LICAMS | 16.2 | | | 43 | | | |
| 8-hydroxyquinoline | | | | 36.9 | | | |
| disulfocatechol | 5.8 | 6.9 | 14.3 | 20.4 | 16.6 | | |

EDTA is ethylenediamine tetra acetic acid and salts thereof, DTPA is diethylenetriaminepentaacetic acid and salts thereof, DPTA is Hydroxylpropylenediaminetetraacetic acid and salts thereof, NTA is nitrilotriacetic acid and salts thereof, CDTA is 1,2-cyclohexanediamine tetra acetic acid and salts thereof, PDTA is propylenediamine tetra acetic acid and salts thereof. Desferroxamine B is a commercially available iron chelating drug, desferal®. MECAMS, 4-LICAMS and 3,4-LICAMS are described by Raymond et al. in "Inorganic Chemistry in Biology and Medicine", Chapter 18, ACS Symposium Series, Washington, D.C. (1980). Log stability constants are from "Critical Stability Constants", A. E. Martell and R. M. Smith, Vols. 1-4, Plenum Press, NY (1977); "Inorganic Chemistry in Biology and Medicine", Chapter 17, ACS Symposium Series, Washington, D.C. (1980); R. D. Hancock and A. E. Martell, Chem. Rev. vol. 89, p. 1875-1914 (1989) and "Stability Constants of Metal-ion Complexes", The Chemical Society, London, 1964.

In many instances, the growth of a particular microorganism may be limited by the availability of a particular metal-ion, for example, due to a deficiency of this metal-ion. In such cases it is desirable to select a metal-ion sequestrant with a very high specificity or selectivity for a given metal-ion. Metal-ion sequestrants of this nature may be used to control the concentration of the target metal-ion and thus limit the growth of the organism(s), which require this metal-ion. However, it may be necessary to control the concentration of the target metal, without affecting the concentrations of beneficial metal-ions such as potassium and calcium. One skilled in the art may select a metal-ion sequestrant having a high selectivity for the target metal-ion. The selectivity of a metal-ion sequestrant for a target metal-ion is given by the difference between the log of the stability constant for the target metal-ion, and the log of the stability constant for the interfering (beneficial) metal-ions. For example, if a treatment required the removal of Fe(III), but it was necessary to leave the Ca-concentration unaltered, then from Table 1, DTPA would be a suitable choice since the difference between the log stability constants 28−10.8=17.2, is very large. 3,4-LICAMS would be a still more suitable choice since the difference between the log stability constants 43−16.2=26.8, is the largest in Table 1.

It is preferred that said metal-ion sequestrant has a high-affinity for iron, and in particular iron(III). It is preferred that the stability constant of the sequestraint for iron(III) be greater than $10^{10}$. It is still further preferred that the metal-ion sequestrant has a stability constant for iron greater than $10^{20}$. It is still further preferred that the metal-ion sequestrant has a stability constant for iron greater than $10^{30}$.

It is preferred that the container comprises derivatized nanoparticles comprising inorganic nanoparticles having an attached metal-ion sequestrant, wherein said inorganic nanoparticles have an average particle size of less than 200 nm and the derivatized nanoparticles have a stability constant greater than $10^{10}$ with iron (III). It is further preferred that the derivatized nanoparticles have a stability constant greater than $10^{20}$ with iron (III). The derivatized nanoparticles are preferred because they have very high surface area and may have a very high-affinity for the target metal-ions. It is preferred that the nanoparticles have an average particle size of less than 100 nm. It is further preferred that the nanoparticles have an average size of less than 50 nm, and most preferably less than 20 nm. Preferably greater than 95% by weight of the nanoparticles are less than 200 nm, more preferably less than 100 nm, and most preferably less than 50 nm. This is preferred because as the particle size becomes smaller, the particles scatter visible-light less strongly. Therefore, the derivatized nanoparticles can be applied to clear, transparent surfaces without causing a hazy or a cloudy appearance at the surface. This allows the particles of the present invention to be applied to packaging materials without changing the appearance of the item. It is preferred that the nanoparticles have a very high surface area, since this provides more surface with which to covalently bind the metal-ion sequestrant, thus improving the capacity of the derivatized nanoparticles for binding metal-ions. It is preferred that the nanoparticles have a specific surface area of greater than 100 m$^2$/g, more preferably greater than 200 m$^2$/g, and most preferably greater than 300 m$^2$/g. For applications of the invention in which the concentrations of contaminant or targeted metal-ions in the environment are high, it is preferred that the nanoparticles have a particle size of less than 20 nm and a surface area of greater than 300 m$^2$/g. Derivatized nanoparticles are described at length in docket 87428 co-filed herewith.

It is preferred that the derivatized nanoparticles have a high stability constant for the target metal-ion(s). The stability constant for the derivatized nanoparticle will largely be determined by the stability constant for the attached metal-ion sequestrant. However, the stability constant for the derivatized nanoparticles may vary somewhat from that of the attached metal-ion sequestrant. Generally, it is anticipated that metal-ion sequestrants with high stability constants will give derivatized nanoparticles with high stability constants. For a particular application, it may be desirable to have a derivatized nanoparticle with a high selectivity for a particular metal-ion. In most cases, the derivatized nanoparticle will have a high selectivity for a particular metal-ion if the stability constant for that metal-ion is about $10^6$ greater than for other ions present in the system.

Metal-ion sequestrants may be chosen from various organic molecules. Such molecules having the ability to form complexes with metal-ions are often referred to as "chelators", "complexing agents", and "ligands". Certain types of organic functional groups are known to be strong "chelators" or sequestrants of metal-ions. It is preferred that the sequestrants of the invention contain alpha-amino carboxylates, hydroxamates, or catechol, functional groups. Hydroxamates, or catechol, functional groups are preferred. Alpha-amino carboxylates have the general formula:

where R is an organic group such as an alkyl or aryl group; M is H, or an alkali or alkaline earth metal such as Na, K, Ca or Mg, or Zn; n is an integer from 1 to 6; and x is an integer from 1 to 3. Examples of metal-ion sequestrants containing alpha-amino carboxylate functional groups include ethylenediaminetetraacetic acid (EDTA), ethylenediaminetetraacetic acid disodium salt, diethylenetriaminepentaacetic acid (DTPA), Hydroxylpropylenediaminetetraacetic acid (DPTA), nitrilotriacetic acid, triethylenetetraaminehexaacetic acid, N,N'-bis(o-hydroxybenzyl)ethylenediamine-N,N'diacteic acid, and ethylenebis-N,N'-(2-o-hydroxyphenyl)glycine.

Hydroxamates (or often called hydroxamic acids) have the general formula:

where R is an organic group such as an alkyl or aryl group. Examples of metal-ion sequestrants containing hydroxamate functional groups include acetohydroxamic acid, and desferroxamine B, the iron chelating drug desferal.

Catechols have the general formula:

Where R1, R2, R3 and R4 may be H, an organic group such as an alkyl or aryl group, or a carboxylate or sulfonate group. Examples of metal-ion sequestrants containing catechol functional groups include catechol, disulfocatechol, dimethyl-2,3-dihydroxybenzamide, mesitylene catecholamide (MECAM) and derivatives thereof, 1,8-dihydroxynaphthalene-3,6-sulfonic acid, and 2,3-dihydroxynaphthalene-6-sulfonic acid.

In a preferred embodiment the metal-ion sequestrant is attached to a nanoparticle by reaction of the nanoparticle with a silicon alkoxide intermediate having the general formula:

wherein x is an integer from 1 to 3;
R is an alkyl group; and R' is an organic group containing an alpha amino carboxylate, a hydroxamate, or a catechol. The —OR-group attaches the silicon alkoxide to the core particle surface via a hydrolysis reaction with the surface of the particles. Materials suitable for practice of the invention include N-(trimethoxysilylpropyl)ethylenediamine triacetic acid, trisodium salt, N-(triethoxysilylpropyl)ethylenediamine triacetic acid, trisodium salt, N-(trimethoxysilylpropyl)ethylenediamine triacetic acid, N-(trimethoxysilylpropyl)diethylenetriamine tetra acetic acid, N-(trimethoxysilylpropyl)amine diacetic acid, and metal-ion salts thereof.

Figure 4:
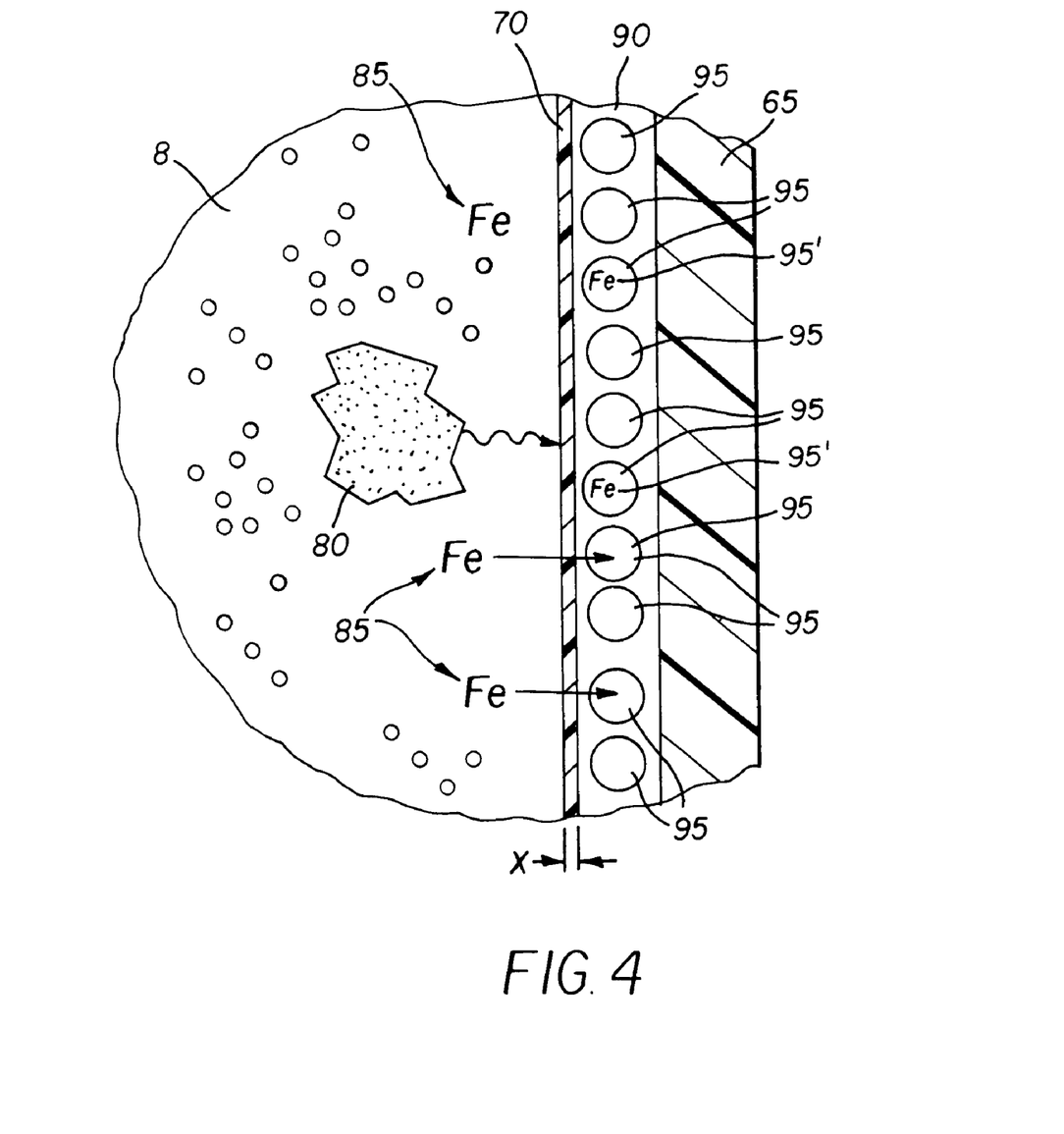
FIG. 4 is a view similar to FIG. 3 illustrating a container made in accordance with the present invention.

Referring to FIG. 4, there is illustrated an enlarged partial cross section view of the wall a fluid container 12 made in accordance with the present invention. The wall of the container 12, which in the embodiment illustrated is a bottle, is made of a material that comprises a barrier layer 70; an outer polymeric layer 65 and an inner polymeric layer 90 between said barrier layer 70 and outer polymeric layer 65. The inner polymeric layer 90 contains a metal-ion sequestrant 95. The barrier layer 70 preferably does not contain the metal-ion sequestrant 95. The outer layer 65 may provide several functions including improving the physical strength and toughness of the article and resistance to scratching, marring, cracking, etc. However, the primary purpose of the barrier layer 70 is to provide a barrier through which micro-organisms 80 present in the contained fluid cannot pass. It is important to limit, or eliminate, in certain applications, the direct contact of micro-organisms 80 with the metal-ion sequestrant 95 or the layer 90 containing the metal-ion sequestrant 95, since many micro-organisms 80, under conditions of iron deficiency, may bio-synthesize molecules which are strong chelators for iron, and other metals. These bio-synthetic molecules are called "siderophores" and their primary purpose is to procure iron for the micro-organisms 80. Thus, if the micro-organisms 80 are allowed to directly contact the metal-ion sequestrant 95, they may find a rich source of iron there, and begin to colonize directly at these surfaces. The siderophores produced by the micro-organisms may compete with the metal-ion sequestrant for the "free" iron ion 85 (or other bio-essential metal) at their surfaces. However, the energy required for the organisms to adapt their metabolism to synthesize these siderophores will impact significantly their growth rate. Thus, one object of the invention is to lower growth rate of organisms in the contained liquid. Since the barrier layer 70 of the invention does not contain the metal-ion sequestrant 95, and because micro-organisms 80 are large, the micro-organisms 80 may not pass or diffuse through the barrier layer 70. The barrier layer 70 thus prevents contact of the micro-organisms 80 with the polymeric layer 90 containing the metal-ion sequestrant 95 of the invention. It is preferred that the barrier layer 70 is permeable to water. It is preferred that the barrier layer 70 has a thickness "x" in the range of 0.1 microns to 10.0 microns. It is preferred that microbes are unable to penetrate, to diffuse or pass through the barrier layer 70. Sequestrant 95 with a sequestered metal-ion is indicated by numeral 95'.

Still referring to FIG. 4, the enlarged sectioned view of the fluid container 12 shown in FIG. 2, illustrates a bottle having barrier layer 70, which is in direct contact with the contained beverage 8, an inner polymeric layer 90 and an outer polymeric layer 65. However, the prior art bottle of FIG. 3 comprises an inner polymeric layer 60 that does not contain any metal-ion sequestering agents according to the present invention. In the prior art bottle illustrated in FIG. 3, the micro-organisms 80 are free to gather the "free" iron ions 85. In the bottle according to the present invention shown in FIG. 4, the inner polymer 90 contains an immobilized metal-ion sequestering agent 95 such as EDTA. In order for the metal-ion sequestering agent 95 to work properly, the inner polymer 90 containing the metal-ion sequestering agent 95 must be permeable to the aqueous solution or beverage 8. Preferred polymers for layers 70 and 90 of the invention are polyvinyl alcohol, cellophane, water-based polyurethanes, polyester, nylon, high nitrile resins, polyethylene-polyvinyl alcohol copolymer, polystyrene, ethyl cellulose, cellulose acetate, cellulose nitrate, aqueous latexes, polyacrylic acid, polystyrene sulfonate, polyamide, polymethacrylate, polyethylene terephthalate, polystyrene, polyethylene, polypropylene or polyacrylonitrile. A water permeable polymer permits water to move freely through the polymer 90 allowing the "free" iron ion 85 to reach and be captured by the agent 95. An additional barrier 70 may be used to prevent the micro-organism 80 from reaching the inner polymer material 90 containing the metal-ion sequestering agent 95 and the sequestered metal-ion 95'. Like the inner polymer material 90, the barrier layer 70 must be made of a water permeable polymer as previously described. The micro-organism 80 is too large to pass through the barrier 70 or the inner polymer layer 90 so it cannot reach the sequestered iron ion 95' now held by the metal-ion sequestering agent 95. By using the metal-ion sequestering agents 95 to significantly reduce the amount of "free" iron ions 85 in the beverage 8, the growth of the micro-organism 80 is eliminated or severely reduced.

Figure 5:
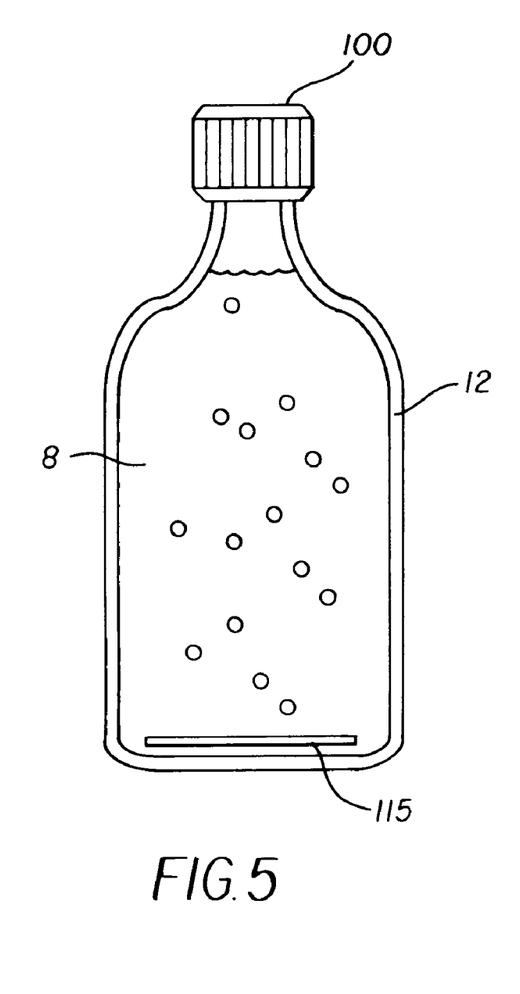
FIG. 5 illustrates a modified bottle and cap assembly also made in accordance with the present invention.
Figure 6:
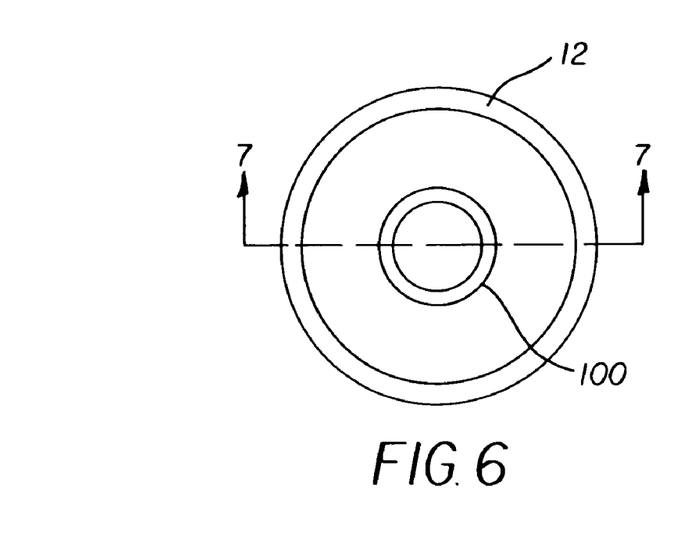
FIG. 6 is a schematic top plan view of the bottle and cap of FIG. 5.
Figure 7:
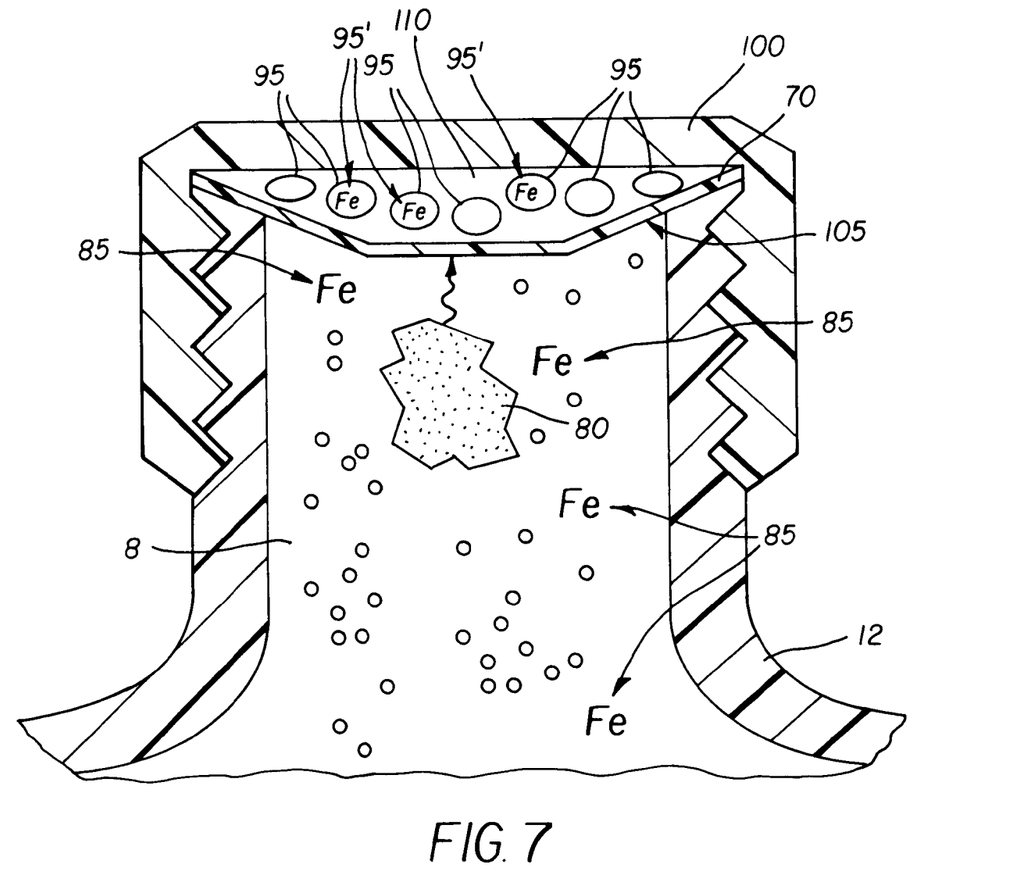
FIG. 7 is an enlarged partial cross sectional view of the bottle and cap taken along line 7-7 of FIG. 6.

In the embodiment shown in FIGS. 5, 6, and 7 the metal-ion sequestering agent 95 is contained in the bottle cap 100 instead of on the inside surface of the bottle 12. An inner portion 105 of the cap 100, which is in intimate contact with the beverage 8, is made of a hydrophilic polymer 110 containing the metal-ion sequestering agent 95 such as EDTA as described above. In some situations, the bottle 8 may need to be placed in the inverted position in order for the sequestrant to come in contact with the contained nutrient. The cap 100 may also have the barrier layer 70 to further prevent the micro-organisms 80 from reaching the sequestered "free" iron ion 95'. In another embodiment (not shown) the cap sealing material could be an open cell foamed structure whose cell walls are coated with the sequestering material.

In another embodiment of the present invention, the sequestering agent 95 may be in a hydrophilic polymeric insert 115 that is placed in the bottle 12 as illustrated in FIG. 5. The insert 115 may be instead of or in addition to the sequestrant in the cap 100 or interior of the bottle. The insert 115 is placed in the bottle 12 but unfolds making it too large to exit the bottle 12. In another version, the insert 115 is molded into the bottom of the bottle 12.

Figure 8:
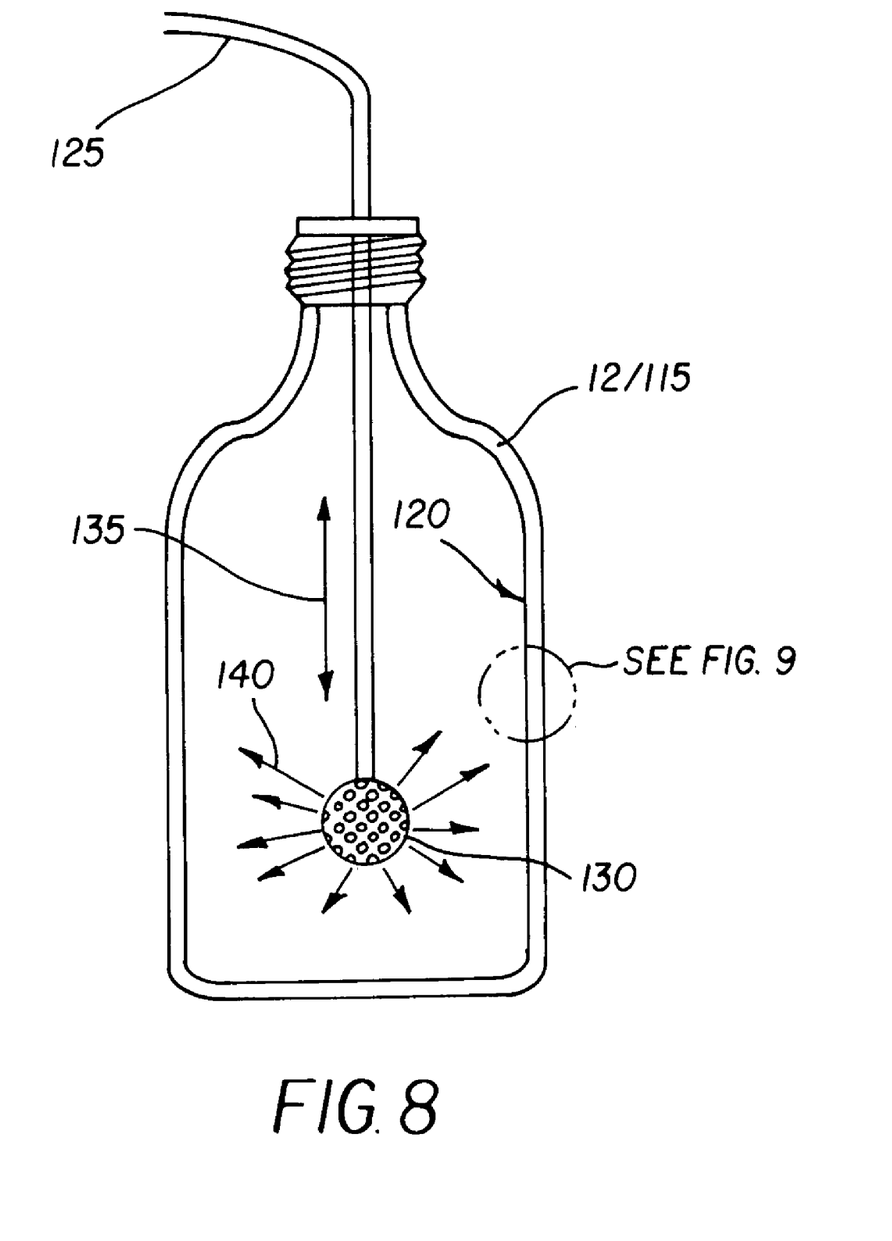
FIG. 8 is a schematic view of another embodiment of the present invention illustrating one method for applying a coating to the interior surface of a bottle made in accordance with the present invention.
Figure 9:
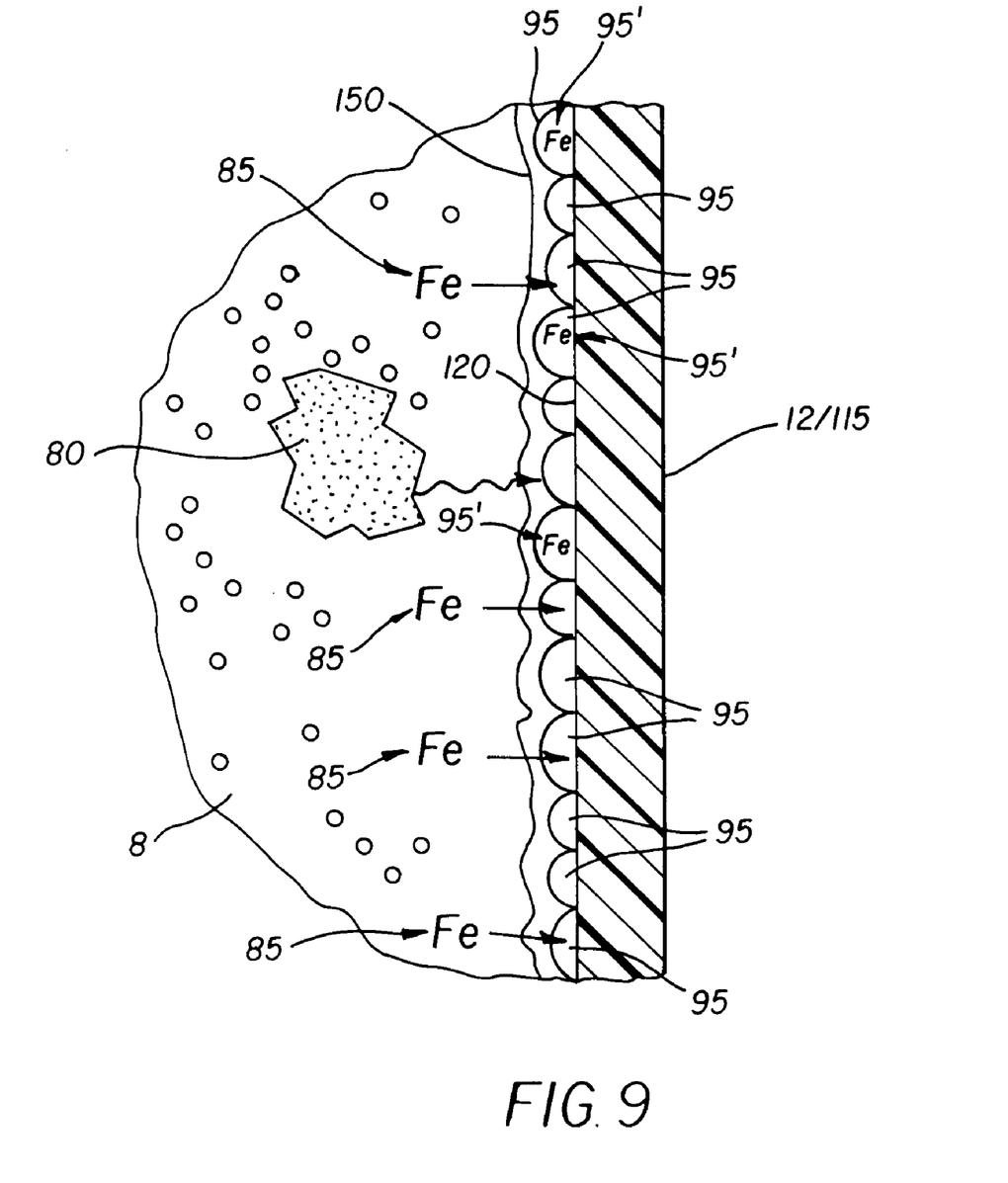
FIG. 9 is an enlarged partial cross sectional view of a portion of the bottle of FIG. 8 illustrating the sprayed coating of the metal-ion sequestering agent.

Referring to FIGS. 8 and 9, there is illustrated yet another embodiment of a bottle 12 made in accordance with the present invention. In this embodiment, the metal-ion sequestering agent 95 is applied to the interior surface 120 of the bottle 12 by spraying a metal-ion sequestering agent 95, for example EDTA, on to the interior surface 120 of the bottle 12, through a supply tube 125 using a spherical shaped nozzle assembly 130. The nozzle assembly 130 is moved up and down in the direction of the arrow 135 while the metal-ion sequestering agent 95 is sprayed as indicated by the arrows 140. It is to be understood that any method of applying coatings to glass, metal or plastic containers may be used as is well known to those skilled in the art of applying such coating. FIG. 9 illustrates an enlarged partial cross sectional view of the portion of the bottle of FIG. 8 where the spray coating 150 of the metal-ion sequestering agent 95 has been applied. As previously discussed in FIG. 4 like numerals indicate like parts and operations. It is of course understood that the inner layer containing the sequestrant may be applied or formed on the inside surface of the container in any appropriate manner. The bottle 12 in this embodiment may be made of any appropriate plastic or glass material. While in the embodiment illustrated substantially the entire interior surface 120 is coated with the metal-ion sequestering agent 95, the present invention is not so limited. Only that portion of the interior surface need be coated as necessary for requesting the desired free metal-ion and any appropriate pattern.

Figure 10:
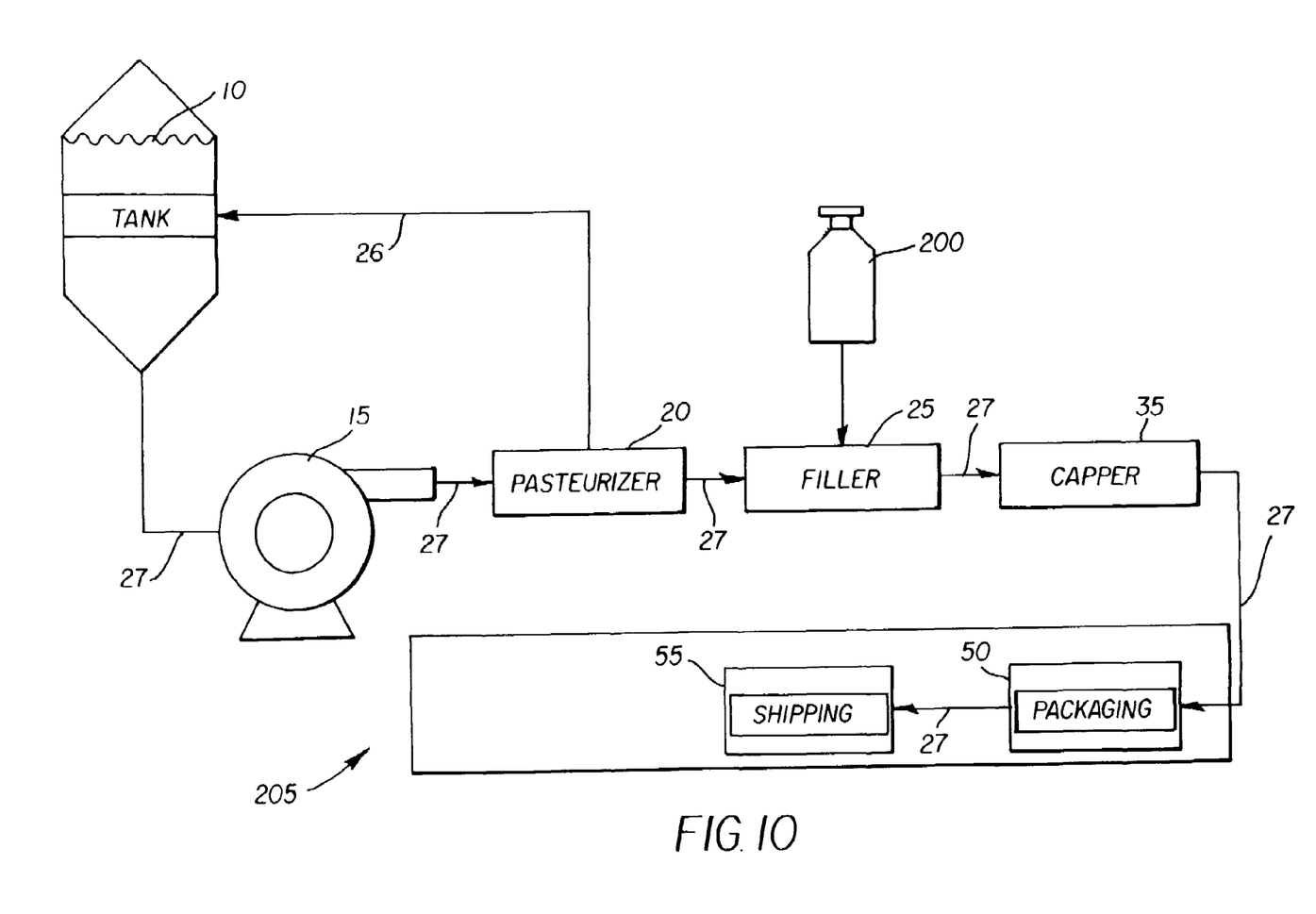
FIG. 10 is a schematic of a hot fill bottling process made in accordance with the present invention.

By using the metal-ion sequestering agents 95 to remove "free" iron 85 as the method for eliminating the micro-organisms 80 that enter the bottles 12 between the filling station 25 and the capper 30, the "hot fill" portion 40 of the process shown in FIG. 1 is no longer necessary. The use of bottles 200, bags, stand up pouches, juice boxes, cans, etc containing metal-ion sequestering agents 95 as described in FIGS. 4 through 9, the process 205 shown in FIG. 10 may be used for bottling the types of beverages and foodstuffs requiring the "hot fill" process. The process of FIG. 10 is similar to that of FIG. 1, like numbers indicate like parts and operations as previously discussed, except that the heating tunnel 40 where the beverage is heated and the cooling tunnel 45 for cooling of the heated bottles are eliminated as they are not needed. By removing the "hot fill" portion 40 (shown in FIG. 1) of the process 205, the amount of energy required for both heating and cooling the bottles during the filling process is greatly reduced while increasing the options in both bottle design and materials to be used in the bottling process. It is of course understood that the certain processes of FIG. 10 may be further modified or eliminated depending on the type of container being used. For example, where a drink box, drink bag, can, is used, a different type of filler or capping/closure device may be utilized as required.

The invention has been described in detail with particular reference to certain preferred embodiments thereof, but it will be understood that variations and modifications can be effected within the scope of the invention, the present invention being defined by the claim set forth herein.

| PARTS LIST | |
|---|---|
| 5 | process |
| 8 | beverage |
| 10 | tank |
| 12 | container/bottle |
| 15 | pump |
| 20 | pasteurizer |
| 25 | filler station |
| 26 | line |
| 27 | processing path |
| 30 | barrier layer |
| 35 | capper |
| 40 | heating tunnel |
| 45 | cooling tunnel |
| 50 | packing station |
| 55 | shipping station |
| 60 | inner polymer material |
| 65 | outer polymer material |
| 70 | barrier layer |
| 80 | micro-organism |
| 85 | "free" iron ion |
| 90 | inner polymer |
| 95 | metal-ion sequestering agent95' |
| 95' | sequestered metal-ion |
| 100 | cap |
| 105 | inner portion |
| 110 | hydrophilic layer |
| 115 | insert |
| 120 | inside surface |
| 125 | supply tube |
| 130 | nozzle assembly |
| 135 | arrow |
| 140 | arrow |
| 150 | spray coating |
| 200 | process |
| 205 | bottle |

What is claimed is:

1. A method of removing a selected metal-ion from a liquid, comprising the steps of:
   providing a container for holding said liquid, said container comprising an internal surface having a metal-ion sequestering agent immobilized in at least a portion of said internal surface for removing a designated metal-ion from said liquid, wherein said metal-ion sequestering agent comprises derivatized nanoparticles comprising inorganic nanoparticles having an attached metal-ion sequestrant, wherein said inorganic nanoparticles have an average particle size of less than 200 nm and the derivatized nanoparticles have a stability constant greater than $10^{10}$ with iron(III), and wherein said metal-ion sequestering agent is immobilized in a polymeric layer, the polymeric layer contacts said liquid, and the polymeric layer is permeable to water;

filling said container with said liquid in an open environment;

closing said container with said liquid contained therein;

said metal-ion sequestering agent removing said designated metal-ion from said liquid; and shipping said container for use of said liquid without any further processing of said container containing said liquid.

2. A method according to claim 1 wherein said container comprises a bottle and cap assembly.

3. A method according to claim 2 wherein said bottle is made of a plastic material.

4. A method according to claim 2 wherein said metal-ion sequestering agent is provided on the entire internal surface of said bottle.

5. A method according to claim 2 wherein said bottle is made of a material that includes said metal-ion sequestering agent.

6. A method according to claim 2 wherein said metal-ion sequestering agent is provided on the internal surface of said cap.

7. A method according to claim 1 wherein said liquid has a pH equal to or greater than about 3.

8. A method according to claim 1 wherein said liquid has a pH equal to or greater than about 4.

9. A method according to claim 1 wherein said sequestering agent has a high-affinity for biologically important metal-ions comprising Mn, Zn, Cu and Fe.

10. A method according to claim 1 wherein said sequestering agent has a high-selectivity for biologically important metal-ions comprising Mn, Zn, Cu and Fe.

11. A method according to claim 1 wherein said sequestering agent has a high-selectivity for certain metal-ions but a low-affinity for at least one other ion.

12. A method according to claim 11 wherein said certain metal-ions comprises Mn, Zn, Cu and Fe and said other at least one ion comprises calcium.

13. A method according to claim 1 wherein said metal-ion sequestering agent has a stability constant greater than $10^{20}$ with iron(III).

14. A method according to claim 1 wherein said metal-ion sequestering agent has a stability constant greater than $10^{30}$ with iron(III).

15. A method according to claim 1, wherein said container further comprises a barrier layer between the metal-ion sequestering agent and the liquid for permitting water to pass therethrough and for blocking microorganisms from passing therethrough.

* * * * *